(12) United States Patent
Krishnan et al.

(10) Patent No.: US 9,552,280 B2
(45) Date of Patent: Jan. 24, 2017

(54) VISUAL ANALYSIS AND DEBUGGING OF COMPLEX EVENT FLOWS

(75) Inventors: Ramkumar Krishnan, Redmond, WA (US); Tihomir Tarnavski, Redmond, WA (US); Sebastien Peray, Dueren (DE); Ivo José Garcia dos Santos, Aachen (DE); Olivier Nano, Aachen (DE); Marcel Tilly, Heinsberg (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 961 days.

(21) Appl. No.: 12/779,058

(22) Filed: May 13, 2010

(65) Prior Publication Data
US 2011/0283239 A1 Nov. 17, 2011

(51) Int. Cl.
G06F 3/048 (2013.01)
G06F 11/36 (2006.01)
G06Q 10/06 (2012.01)
G06Q 10/10 (2012.01)

(52) U.S. Cl.
CPC ....... *G06F 11/3664* (2013.01); *G06F 11/3636* (2013.01); *G06Q 10/063* (2013.01); *G06Q 10/103* (2013.01)

(58) Field of Classification Search
CPC  G06F 17/30516; G06F 11/079; G06F 11/323; G06F 3/0482; G06F 2201/86
USPC ................................. 715/854, 853; 707/132
See application file for complete search history.

(56) References Cited

U.S. PATENT DOCUMENTS

| | | | |
|---|---|---|---|
| 5,911,138 A * | 6/1999 | Li et al. | |
| 6,918,124 B1 * | 7/2005 | Novik et al. | 719/318 |
| 7,428,734 B2 * | 9/2008 | Kobylinski et al. | 719/318 |
| 7,512,829 B2 * | 3/2009 | Mital et al. | 713/502 |
| 8,386,466 B2 * | 2/2013 | Park et al. | 707/713 |
| 2007/0022000 A1 * | 1/2007 | Bodart et al. | 705/10 |
| 2007/0255529 A1 * | 11/2007 | Biazetti et al. | 702/186 |
| 2008/0059563 A1 * | 3/2008 | Bachmann et al. | 709/203 |
| 2008/0120268 A1 * | 5/2008 | Ruiz et al. | 707/1 |
| 2008/0301124 A1 * | 12/2008 | Alves et al. | 707/5 |

(Continued)

OTHER PUBLICATIONS

Roger S. Barga et al., "Consistent Streaming Through Time: A Vision for Event Stream Processing," published 2007, Conference on Innovative Data Systems Research.*

(Continued)

*Primary Examiner* — Doon Chow
*Assistant Examiner* — Andrew T Chiusano
(74) *Attorney, Agent, or Firm* — Nicholas Chen; Kate Drakos; Micky Minhas (57) ABSTRACT

Methods, systems, and computer-readable media to generate a user interface (UI) to analyze a complex event processing (CEP) query are disclosed. A particular method includes receiving data representing an event flow associated with execution of a CEP query. The CEP query includes a plurality of operators. A UI including a graph is generated. The graph includes a plurality of nodes. Each node of the graph corresponds to an operator of the CEP query, and each edge of the graph corresponds to a stream between operators of the CEP query. The method includes receiving an input identifying a particular node of the graph, where the particular node corresponds to a particular operator of the CEP query. In response to the input, an operator-specific output associated with at least one event processed by the particular operator is displayed.

20 Claims, 10 Drawing Sheets

(56) References Cited

U.S. PATENT DOCUMENTS

| | | | |
|---|---|---|---|
| 2009/0024622 A1* | 1/2009 | Chkodrov et al. | 707/6 |
| 2009/0106701 A1* | 4/2009 | Yalamanchi | 715/841 |
| 2009/0262131 A1 | 10/2009 | Suntinger et al. | |
| 2009/0265324 A1 | 10/2009 | Mordvinov et al. | |
| 2009/0287630 A1* | 11/2009 | Kaiser | 706/50 |
| 2009/0327195 A1* | 12/2009 | Iscen | 706/47 |
| 2010/0198776 A1* | 8/2010 | Wang et al. | 706/58 |
| 2010/0306709 A1* | 12/2010 | Lynch et al. | 715/854 |
| 2011/0060496 A1* | 3/2011 | Nielsen et al. | 701/33 |
| 2011/0227925 A1* | 9/2011 | De Pauw et al. | 345/440 |
| 2012/0173927 A1* | 7/2012 | Rymeski et al. | 714/26 |

OTHER PUBLICATIONS

M.H. Ali et al., "Microsoft CEP Server and Online Behavioral Targeting," Aug. 24, 2009, Very Large Database Endowment.*

Alain Biem et al., "IBM InfoSphere Streams for Scalable, Real-Time, Intelligent Transportation Services," Jun. 6, 2010, SIGMOD.*

Oracle CEP Getting Started, May 2009. See p. 3-54 to 3-55.*

Robins, D. "Complex event processing." Second International Workshop on Education Technology and Computer Science. Wuhan. 2010.*

Cugola, Gianpaolo, and Alessandro Margara. "Processing flows of information: From data stream to complex event processing." ACM Computing Surveys (CSUR) 44.3 (2012): 15.*

Suntinger, et al., "The Event Tunnel: Interactive Visualization of Complex Event Streams for Business Process Pattern Analysis", Retrieved at << http://ieeexplore.ieee.org/stamp/stamp.jsp?tp=&arnumber=4475466 >>, IEEE VGTC Pacific Visualization Symposium, PacificVis, Mar. 5-7, 2008, pp. 111-118.

Morrell, et al., "Complex Event Processing with Coral8", Retrieved at << http://download.microsoft.com/download/5/6/6/566AEA2A-C50E-47B8-890E-BCF4E0EC5D0B/Complex_Event_Processing_with_Coral8_Final.pdf >>, Jun. 2008, pp. 1-16.

Krämer, Jürgen., "Continuous Queries Over Data Streams—Semantics and Implementation", Retrieved at << http://deposit.d-nb.de/cgi-bin/dokserv?idn=986373060&dok_var=d1&dok_ext=pdf&filename=986373060.pdf >>, 2007, pp. 313.

Grimes, Seth., "Data Streams, Complex Events, and BI", Retrieved at << http://altaplana.com/TT-DataStreamsComplexEventsBI.pdf >>, International Data Warehouse & Business Intelligence Summit, Jun. 11-13, 2008, pp. 52.

Brandl, et al., "Complex Event Processing in the Context of Business Activity Monitoring", Retrieved at << http://www.citt-online.com/downloads/Diplomarbeit_BaGu_Final.pdf >>, May 31, 2007, pp. 240.

"Macro on CEP", Retrieved at << http://rulecore.com/CEPblog/?p=67 >>, Dec. 30, 2008, pp. 6.

Palmer, Mark., "Progress Apama & Event Processing", Retrieved at << http://complexevents.com/slides/Event_Processing_Symposum-Mark_Palmer_Progress.pdf >>, Retrieved Date: Mar. 30, 2010, pp. 35.

Gerea, Ciprian, "Adapters for Event Processing Systems", U.S. Appl. No. 12/603,416, filed Oct. 21, 2009, pp. 21.

Schindlauer, Roman, "Event Processing With XML Query Based on Reusable XML Query Template", U.S. Appl. No. 12/603,308, filed Oct. 21, 2009, pp. 24.

Grabs, Torsten W., "Time-Based Event Processing Using Punctuation Events", U.S. Appl. No. 12/603,445, filed Oct. 21, 2009, pp. 22.

Zabback, Peter, "Partitioned Query Execution in Event Processing Systems", U.S. Appl. No. 12/603,385, filed Oct. 21, 2009, pp. 23.

"Using the Visual Debugger", StreamBase, viewed on Apr. 16, 2010, 9 pages.

"Intermediate Stream Dequeuing", StreamBase, viewed on Apr. 16, 2010, 6 pages.

"Streambase Release Notes", StreamBase 6.6.0, Apr. 13, 2010, viewed on Apr. 16, 2010, 17 pages.

* cited by examiner

VISUAL ANALYSIS AND DEBUGGING OF COMPLEX EVENT FLOWS

BACKGROUND

Complex event processing (CEP) has become a popular problem solving paradigm in computer software. CEP provides the ability to analyze high-volume and high-speed event streams. CEP may be used in domains, such as manufacturing and process control, utilities, algorithmic financial trading, web applications, information technology, and data center monitoring.

The time-sensitive and real-time nature of events that flow through a CEP system may make determining the correctness and validity of CEP results a challenging task. Moreover, it may be difficult to present CEP event information in a manner that is easy for CEP software developers to evaluate, because of the large number of CEP events that can be processed by a CEP system in a short period of time.

SUMMARY

Visual analysis and debugging of CEP event flows is disclosed. A CEP engine may execute a CEP query (e.g., sequence of CEP operators) on an event stream. The CEP engine may generate an event flow (e.g., a log of the processed sequence of events) during execution of the CEP query. The event flow may be used to generate a user interface (UI) that represents the CEP query and the flow of events through the CEP query. For example, the UI may include a graph, where each node of the graph corresponds to an operator of the CEP query and each edge of the graph corresponds to a connection (e.g., stream) between two operators.

The UI may provide tools to visually analyze the flow of events through the CEP query. For example, the UI may display operator-specific outputs (e.g., intermediate event states) at each node of the graph, thereby providing users with a visual indicator of how particular events are transformed from the time they enter the CEP query to the time they exit the CEP query. The UI may also execute analysis functions, such as filtering, root cause analysis, event propagation analysis, and partition analysis. The UI may be operable to simulate stepping back in time and stepping forward in time, thereby providing users with a step-by-step understanding of how a particular event flowed through the CEP query. The UI and analysis tools may enable users to debug the CEP query (e.g., determine what may be causing erroneous CEP results and what corrective actions may be taken to prevent the erroneous CEP results).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method includes receiving data representing an event flow associated with execution of a complex event processing (CEP) query. The CEP query includes a plurality of operators. The method also includes generating a user interface (UI), where the UI includes a graph that includes a plurality of nodes. Each node of the graph corresponds to an operator of the CEP query, and each edge of the graph corresponds to a stream between operators of the CEP query. The method further includes receiving an input identifying a particular node of the graph, where the particular node corresponds to a particular operator of the CEP query. The method includes, in response to the input, displaying an operator-specific output associated with at least one event processed by the particular operator.

In another particular embodiment, a system includes a processor and a memory coupled to the processor. The memory stores instructions, that when executed by the processor, cause execution of a CEP engine and an event flow debugger. The CEP engine is configured to execute a CEP query that includes a plurality of operators and to generate data representing an event flow based on the execution of the CEP query. The event flow debugger is configured to generate a UI representing the event flow, where the UI includes a graph that includes a plurality of nodes. Each node of the graph corresponds to an operator of the CEP query, and each edge of the graph corresponds to a stream connection between operators of the CEP query. The event flow debugger is also configured to receive input identifying a particular node of the graph, where the particular node corresponds to a particular operator of the CEP query. The event flow debugger is further configured to, in response to the input, display an operator-specific output associated with at least one event processed by the particular operator of the CEP query.

In another particular embodiment, a computer-readable medium includes instructions, that when executed by a computer, cause the computer to receive data representing an event flow associated with execution of a CEP query. The CEP query includes a plurality of operators. The instructions also cause the computer to generate a UI representing the event flow, where the UI includes a graph that has a plurality of nodes. The UI displays a first state of operation of the CEP query corresponding to a first time. The instructions further cause the computer to receive input identifying a step back function of the UI. The instructions cause the computer to, in response to the input, display a second state of operation of the CEP query corresponding to a second time that is prior to the first time.

Figure 1:
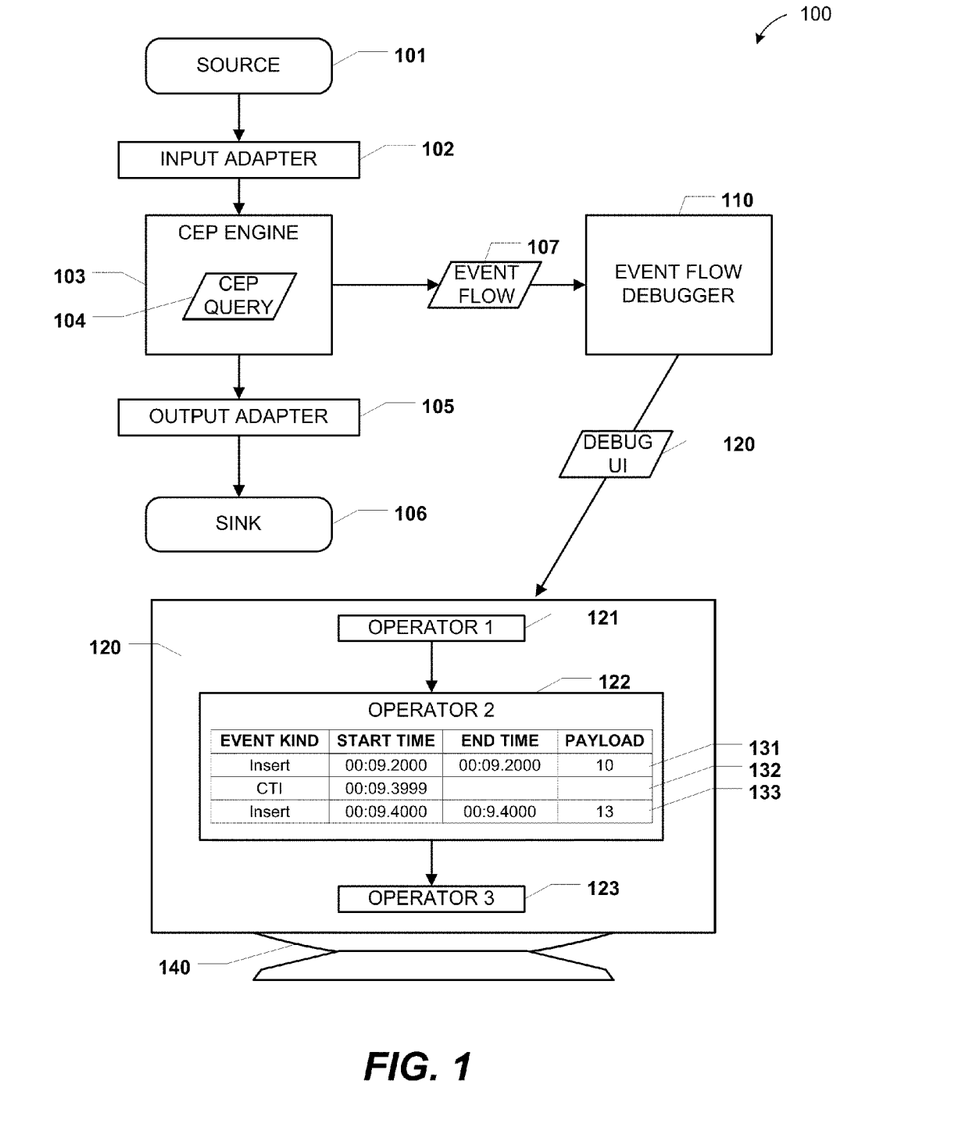
FIG. 1 is a diagram to illustrate a particular embodiment of a system of generating a user interface (UI) to analyze a complex event processing (CEP) query.

FIG. 1 is a diagram to illustrate a particular embodiment of a system 100 of generating a user interface (UI) to analyze a representative complex event processing (CEP) query 104.

The CEP query 104 may be executed by a CEP engine 103. In a particular embodiment, the CEP engine 103 receives events from one or more event sources (e.g., an illustrative source 101) via one or more input adapters (e.g., an illustrative input adapter 102) and transmits results to one or more event sinks (e.g., an illustrative sink 106) via one or more output adapters (e.g., an illustrative output adapter 105). In a particular embodiment, the input adapter 102 and the output adapter 105 are operable to convert events received from the source 101 into a native format of the CEP engine 103 and to convert results transmitted to the sink 106 from the native format of the CEP engine 103, respectively.

As an illustrative example, the CEP engine 103 may be part of an algorithmic stock trading application, the source 101 may provide real-time stock ticker prices, and the sink 106 may be an online stock broker's website. In such an example, the CEP query 104 may define the conditions under which a buy order or a sell order is submitted. For example, the CEP query 104 may indicate that a buy order for 100 shares should be placed when the price of a particular stock rises 5% during an hour and that a sell order for 100 shares should be placed when the price of a particular stock drops 5% during an hour. Thus, the CEP engine 103 may implement a stock trading algorithm based on real-time stock prices.

During execution of the CEP query 104, the CEP engine 103 may produce data representing an event flow 107. The event flow 107 may indicate when each event processed by the CEP query 104 entered and exited individual operators of the CEP query 104. Thus, the event flow 107 may be used to reconstruct the flow of events through the CEP query 104. The event flow 107 may be received and used by the event flow debugger 110 while the CEP query 104 is executing or after the CEP query 104 has finished executing. The event flow 107 may thus include a sequence of events associated with the executing/previously executed CEP query 104. When the CEP query 104 has finished executing, the event flow 107 may be represented by a computer file (e.g., stored in a memory of the CEP engine 103).

The event flow debugger 110 may generate a user interface (UI) (e.g., an illustrative debug UI 120) representing the event flow 107. The UI may include a graph that includes a plurality of nodes, where each node of the graph corresponds to an operator of the CEP query 104 and where each edge of the graph corresponds to a stream connection between operators of the CEP query 104. Thus, the CEP query 104 may be visualized as a set of nodes connected by streams where events flow in a direction from an input node to an output node. For example, the CEP query 104 may include three operators: "OPERATOR 1," "OPERATOR 2," and "OPERATOR 3." The debug UI 120 (illustrated in FIG. 1 as being displayed at a display device 140) may include a node for each of the operators. For example, the debug UI 120 may include a first node 121 corresponding to "OPERATOR 1," a second node 122 corresponding to "OPERATOR 2," and a third node 123 corresponding to "OPERATOR 3."

Each of the nodes 121-123 may be operable to display intermediate states (e.g., operator-specific outputs) for events. The operator-specific output associated with a particular event may include an event kind, an event start time, an event end time, a new event end time, a log time, latency information, a data payload, or any combination thereof.

For example, in the particular embodiment illustrated in FIG. 1, an initial display of the debug UI 120 may include all three nodes 121-123 in a "collapsed" state. That is, the second node 122 may initially be collapsed similar in presentation to the first node 121 and the third node 123. In response to input (e.g., user input) at the second node 122, the debug UI 120 may "expand" the second node 122 and may display events processed by "OPERATOR 2." For example, in the particular embodiment illustrated in FIG. 1, the events processed by "OPERATOR 2" include a first insert event 131, a current time increment (CTI) event 132, and a second insert event 133. In a particular embodiment, a CTI event is a punctuation event used by the CEP engine 103 to finalize events and reduce latency. For example, a CTI event may indicate that no subsequently received event will have a start time earlier than a timestamp of the CTI event.

In operation, the CEP engine 103 may generate the event flow 107 during execution of the CEP query 104. The event flow debugger 110 may receive the event flow 107 while the CEP query 104 is executing or after the CEP query 104 has completed execution. The event flow debugger 110 may process (e.g., parse) the event flow 107 to generate the debug UI 120, where the debug UI 120 includes a graph that has a node for each operator of the CEP query 104. For example, the graph may include three nodes 121-123 corresponding to three operators: "OPERATOR 1," "OPERATOR 2," and "OPERATOR 3." In response to input at the debug UI 120, the debug UI may display operator-specific outputs (e.g., intermediate states) of events at a particular operator. For example, the debug UI 120 may display intermediate states as illustrated for three events 131-133 at "OPERATOR 2."

It should be noted that the CEP engine 103 and the event flow debugger 110 may be located at the same computing device or at different computing devices that are communicatively coupled by a network (e.g., a local area network (LAN) or the Internet).

It will be appreciated that the debug UI 120 may provide a visualization of the flow of events through the CEP query 104. For example, the debug UI 120 may provide operator-specific outputs (e.g., intermediate states) at each node of the graph to provide users (e.g., software developers) with a visual indicator of how particular events are transformed from the time they enter the CEP query 104 to the time they exit the CEP query 104, thereby enabling granular CEP query debugging.

Figure 2:
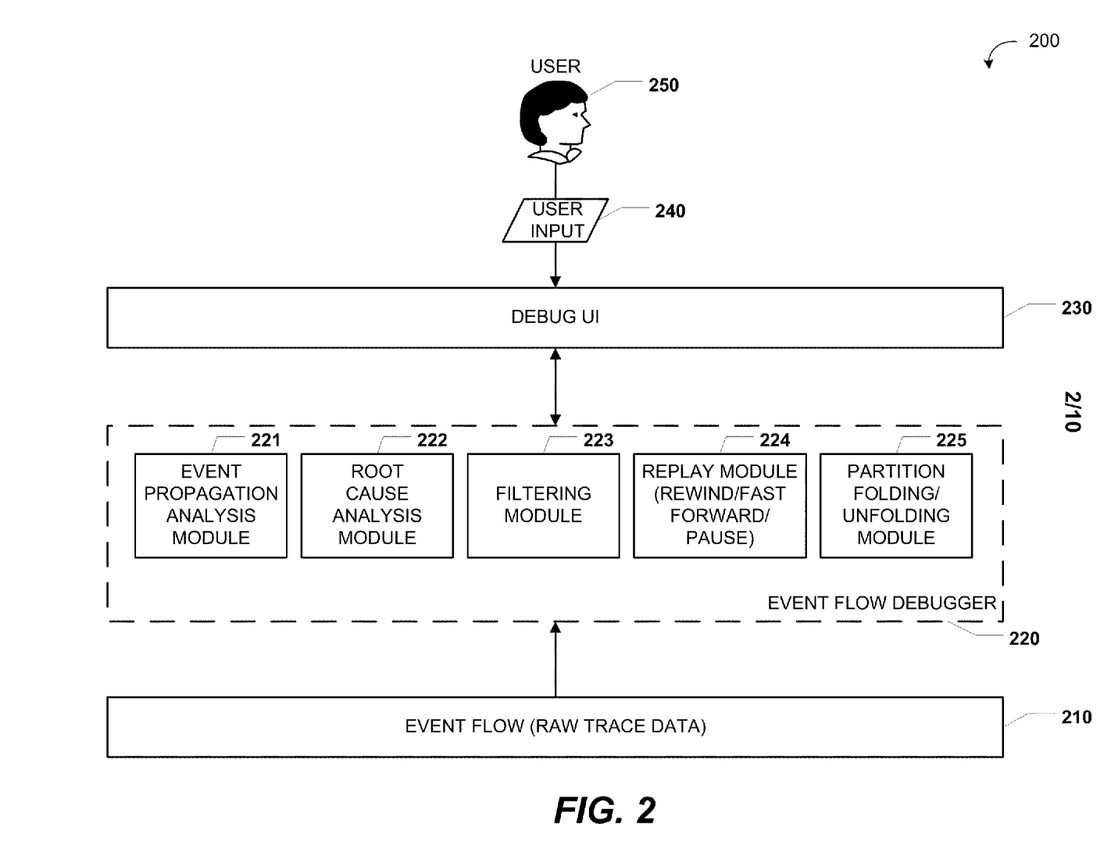
FIG. 2 is a block diagram to illustrate another particular embodiment of a system of generating a UI to analyze a CEP query.

FIG. 2 is a block diagram to illustrate another particular embodiment of a system 200 of generating a UI to analyze a CEP query. The system 200 may be represented via a layered architecture, as illustrated in FIG. 2.

A bottom layer of the system 200 may include raw trace data representing an event flow 220. In an illustrative embodiment, the event flow 220 includes the event flow 107 of FIG. 1. The event flow 220 may be input into an event flow debugger 220. In an illustrative embodiment, the event flow debugger 220 is the event flow debugger 110 of FIG. 1. The event flow debugger 220 may generate a debug UI 230. The debug UI 230 may receive user input 240 from a user of the system 200 (e.g., an illustrative user 250) and may transmit the user input 240 to the event flow debugger 220. In response to the user input 240, the event flow debugger 220 may modify the debug UI 230. In an illustrative embodiment, the debug UI 230 is the debug UI 120 of FIG. 1.

The event flow debugger 220 may include various modules configured to execute various analysis functions on the event flow 210. The modules may be "stacked" on top of each other, such that the output from one module is input to another. Thus, at each stage of analysis, a user may be provided multiple options on how to perform further analysis based on the results of a previous analysis. Therefore, the "stack" of analysis modules may be seen as a particular path within a "tree" of possible analyses, where at each level of the tree a user may elect to branch off in one of multiple directions.

For example, the event flow debugger 220 may include an event propagation analysis (EPA) module 221. Generally, EPA may be performed with respect to a particular event to identify other downstream events that were caused by the particular event. Thus, when the user input 240 selects a particular event in a particular operator of the debug UI 230 for EPA, the EPA may identify (e.g., highlight at the debug UI 230) events in operators that feed out of the particular operator. For example, the user 250 may determine that the particular event includes erroneous data and may want to find downstream events that were caused by the particular event, since the downstream events may also include erroneous data. The user 250 may use EPA to identify such downstream events.

The event flow debugger 220 may also include a root cause analysis (RCA) module 222. RCA may be understood as the inverse of EPA. Thus, RCA may be performed with respect to a particular event to identify other upstream events that caused the particular event. Thus, when the user input 240 selects a particular event in a particular operator of the debug UI 230 for RCA, the RCA may identify (e.g., highlight at the debug UI 230) events in operators that feed into the particular operator. For example, the user 250 may determine that the particular event includes erroneous data and may want to find upstream events that caused the particular event in an attempt to debug the problem. The user 250 may use RCA to identify such upstream events.

The event flow debugger 220 may further include a filtering module 223. The filtering module 223 may filter the events displayed at a particular node of the debug UI 230 (e.g., a particular operator of the CEP query) to produce a filtered subset of events. The filtering may be performed based on user-defined filtering criteria. For example, the filtering criteria may be provided by the user 250 as part of the user input 240. The filtering criteria may be based on event kind, event start time, event end time, new event end time, event log time, event latency, event payload, or any combination thereof. The filtering module 223 may cause the display UI 230 to hide events that do not satisfy the filtering criteria while continuing to display events that satisfy the filtering criteria. In a particular embodiment, the filtering module 223 may filter events at individual operators of a CEP query as well across all operators of a CEP query.

The event flow debugger 220 may include a replay module 224. The replay module 224 may be operable to implement rewind, fast forward, and pause functionality on the debug UI 230. Providing a familiar visual metaphor such as rewind/fast forward/pause may enable the user 250 to more easily evaluate the data being presented by the debug UI 230. For example, the debug UI 230 may initially display a first state of operation of a CEP query corresponding to a first time. To illustrate, the first state of operation may be reflected by the debug UI 120 as depicted in FIG. 1, where the events 131-133 are located at "OPERATOR 2." When the user input 240 indicates a rewind (e.g., step back) function, the replay module 224 may cause the debug UI 230 to display a second state of operation of the CEP query corresponding to a second time that is prior to the first time. To illustrate, in FIG. 1, displaying the second state of operation may include moving the events 131-133 from "OPERATOR 2" to a previous operator (e.g., "OPERATOR 1"). When the user input indicates a fast forward (e.g., step forward) function, the replay module 224 may cause the debug UI 230 to display a third state of operation of the CEP query corresponding to a third time that is subsequent to the second time. To illustrate, in FIG. 1, displaying the third state of operation may include moving the events 131-133 to a subsequent operator (e.g., "OPERATOR 3"). The replay module may also be operable to "pause" playback (e.g., a timed recreation) of the event flow 210 at the debug UI 230.

The event flow debugger 220 may also include a partition folding/unfolding module 225. The partition folding/unfolding module 225 may be applicable to nodes at the debug UI 230 that correspond to partitioning operators of the CEP query. Generally, partitioning operators (also called grouping operators) may parallelize execution of a CEP query by routing the events of an incoming event stream (e.g., represented by an incoming edge at the graph displayed by the debug UI 230) into one of a plurality of individual execution units. The outputs of the individual execution units may be merged to produce an output event stream (e.g., represented by an outgoing edge at the graph displayed by the debug UI 230). Since partitioning operators may generate any number of partitions and may include nested partitions, partitioning operators may initially be displayed at the debug UI 230 in a "folded" state. That is, a partitioning operator may be displayed as a single execution unit. In response to the user input 240, the partition folding/unfolding module 225 may "unfold" the partitioning operator and display the plurality of partitions generated by the partitioning operator. The partition folding/unfolding module 225 may also "fold" a previously "unfolded" partition.

Each of the plurality of partitions may be displayed as single partition-specific execution units or as nested units that may be further "unfolded." When the debug UI 230 displays a particular partition, the debug UI 230 may display partition-specific outputs for events processed by the particular partition. In a particular embodiment, the particular partition may be selected based on a user-defined set of partition keys. For example, the partitioning operator may divide the incoming event stream into 100 partitions having the partitions keys 1 to 100, and the user input 240 may indicate that the user 250 only desires to see partition-specific outputs for partitions 25-35. In response, the debug UI 230 may display the partitions 25-35 in an "unfolded" state and may display the remaining partitions 1-24 and 36-100 in a "folded" state.

It will be appreciated that the system 200 of FIG. 2 may provide users (e.g., the user 250) with combinable analyses at the debug UI 230. For example, the user 250 could combine application of the replay module 224 and the partition folding/unfolding module 225 to step forwards and backwards through the flow of events in an individual partition. As another example, the user 250 could combine application of the filtering module 223, the root cause analysis module 222, and the replay module 224 to identify all events of the kind "Insert" that caused an erroneous particular event and view flow through the CEP query step-by-step.

Figure 3:
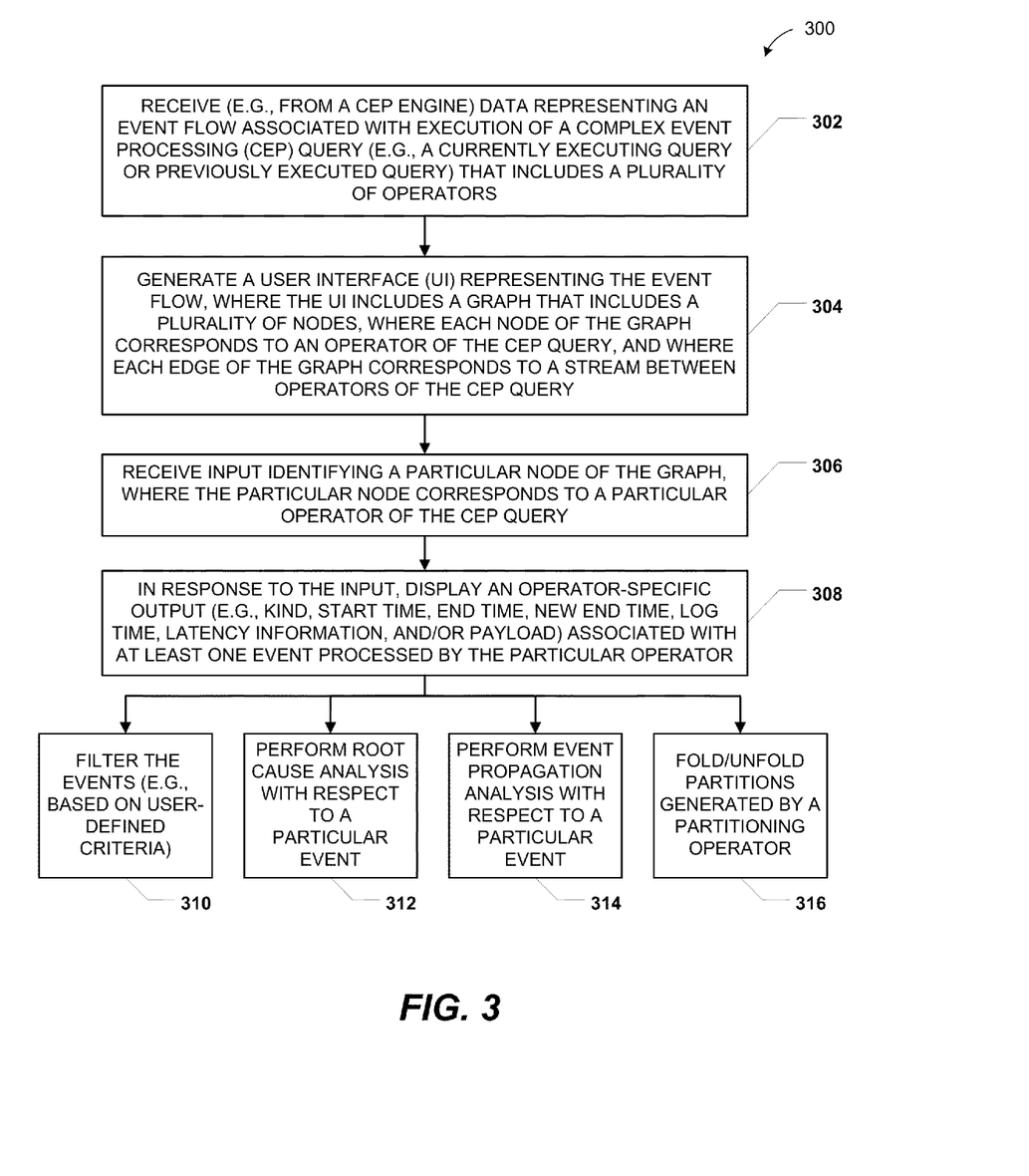
FIG. 3 is a flow diagram to illustrate a particular embodiment of a method of generating a UI to analyze a CEP query.

FIG. 3 is a flow diagram to illustrate a particular embodiment of a method 300 of generating a UI to analyze a CEP query. In an illustrative embodiment, the method 300 may be performed by the system 100 of FIG. 1 or the system 200 of FIG. 2.

The method 300 includes receiving data representing an event flow associated with execution of a CEP query that includes a plurality of operators, at 302. The data may be received from a CEP engine and the CEP query may be a currently executing query or a previously executed query. For example, in FIG. 2, the event flow debugger 220 may receive the event flow 210, where the event flow 210 is associated with a CEP query. In an illustrative embodiment, the CEP query is the CEP query 104 of FIG. 1.

The method 300 also includes generating a UI representing the event flow, at 304. The UI includes a graph that has a plurality of nodes, where each node of the graph corresponds to an operator of the CEP query and each edge of the graph corresponds to a stream between operators of the CEP query. For example, in FIG. 2, the event flow debugger may generate the debug UI 230.

The method 300 further includes receiving input identifying a particular node of the graph, where the particular node corresponds to a particular operator of the CEP query, at 306. For example, in FIG. 2, the user input 240 may be received by the event flow debugger 220, where the user input identifies a particular node of the graph. In an illustrative embodiment, the particular node is the second node 122 of FIG. 2, which corresponds to "OPERATOR 2."

The method 300 includes, in response to the input, displaying an operator-specific output associated with at least one event processed by the particular operator, at 308. The operator-specific output for an event may include a kind, a start time, an end time, a new end time, a log time, latency information, a payload, or any combination thereof. For example, in FIG. 2, the debug UI 230 may display operator-specific outputs for one or more events. In an illustrative embodiment, the operator specific outputs include "Event Kind," "Start Time," "End Time," and "Payload," as depicted in FIG. 1.

The method 300 also includes performing one or more analyses at the debug UI. For example, the method 300 may include filtering the events (e.g., based on user-defined filtering criteria), at 310. Alternately, or in addition, method 300 may include performing root cause analysis with respect to a particular event, at 312, performing event propagation analysis with respect to a particular event, at 314, or folding/unfolding partitions generated by a partitioning operator, at 316. For example, in FIG. 2, events may be filtered by the filtering module 223, root cause analysis may be performed by the root cause analysis module 222, event propagation analysis may be performed by the event propagation analysis module 221, and partitions may be folded/unfolded by the partition folding/unfolding module 225.

Figure 4:
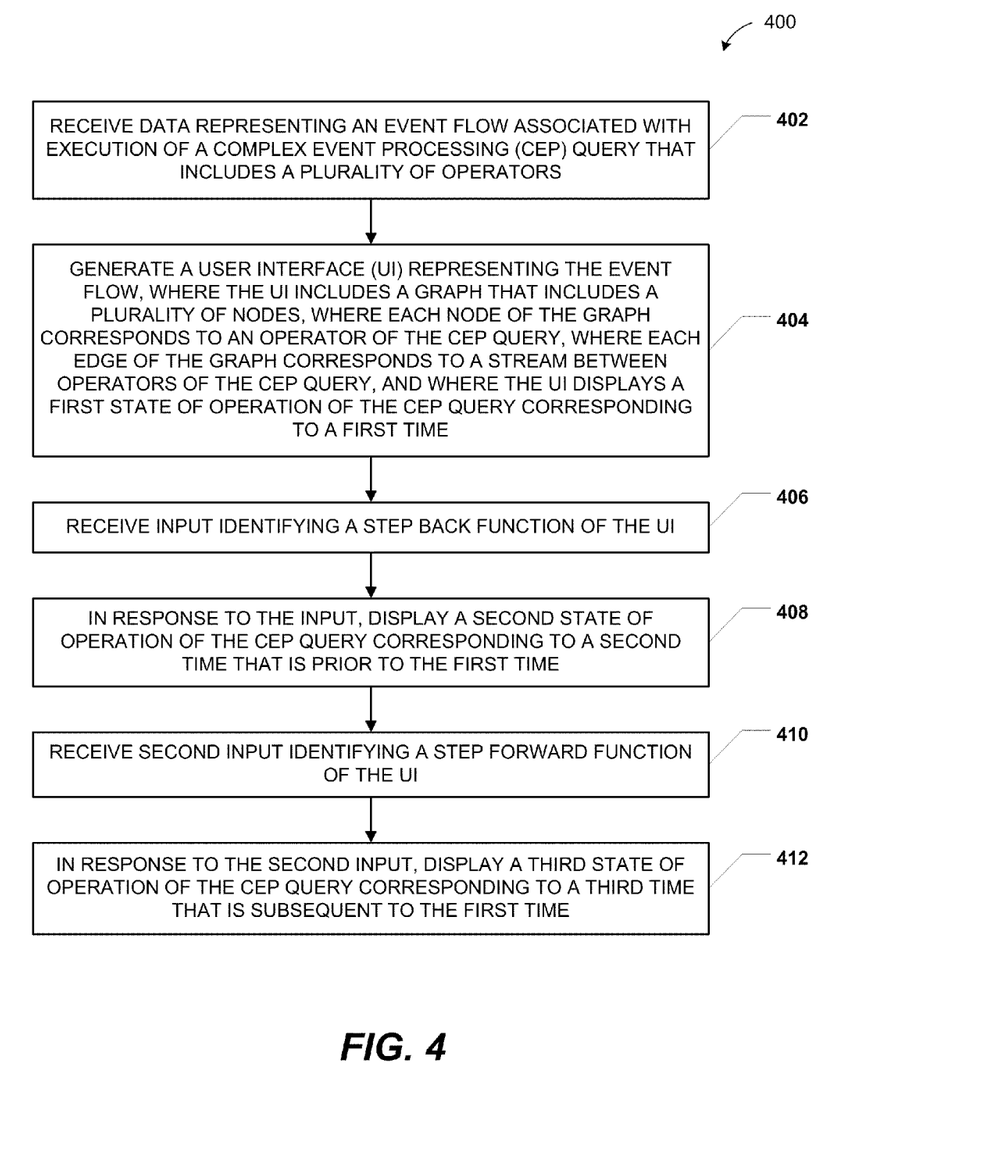
FIG. 4 is a flow diagram to illustrate another particular embodiment of a method of generating a UI to analyze a CEP query.

FIG. 4 is a flow diagram to illustrate another particular embodiment of a method 400 of generating a UI to analyze a CEP query. In an illustrative embodiment, the method 400 may be performed by the system 100 of FIG. 1 or the system 200 of FIG. 2.

The method 400 includes receiving data representing an event flow associated with execution of a CEP query that includes a plurality of operators, at 402. For example, in FIG. 2, the event flow debugger 220 may receive the event flow 210, where the event flow 210 is associated with a CEP query. In an illustrative embodiment, the CEP query is the CEP query 104 of FIG. 1.

The method 400 also includes generating a UI representing the event flow, at 404. The UI includes a graph that has a plurality of nodes. Each node of the graph corresponds to an operator of the CEP query and each edge of the graph corresponds to a stream between operators of the CEP query. The UI displays a first state of operation of the CEP query corresponding to a first time. For example, in FIG. 2, the event flow debugger may generate the debug UI 230, where the debug UI 230 initially displays a first state of operation of the CEP query corresponding to a first time.

The method 400 further includes receiving input identifying a step back function of the UI, at 406. For example, in FIG. 2, the user input 240 may indicate a step back function of the debug UI 230. The method 400 includes, in response to the input, displaying a second state of operation of the CEP query corresponding to a second time that is prior to the first time, at 408. For example, in FIG. 2, the replay module 224 may modify the debug UI 230, such that the debug UI 230 displays a second state of operation of the CEP query corresponding to a second time that is prior to the first time.

The method 400 also includes receiving second input identifying a step forward function of the UI, at 410. For example, in FIG. 2, the user input 240 may also indicate a step forward function of the debug UI 230. The method 400 includes, in response to the second input, displaying a third state of operation of the CEP query corresponding to a third time that is subsequent to the first time, at 412. For example, in FIG. 2, the replay module 224 may modify the debug UI 230, such that the debug UI 230 displays a third state of operation of the CEP query corresponding to a third time that is subsequent to the first time.

Figure 5:
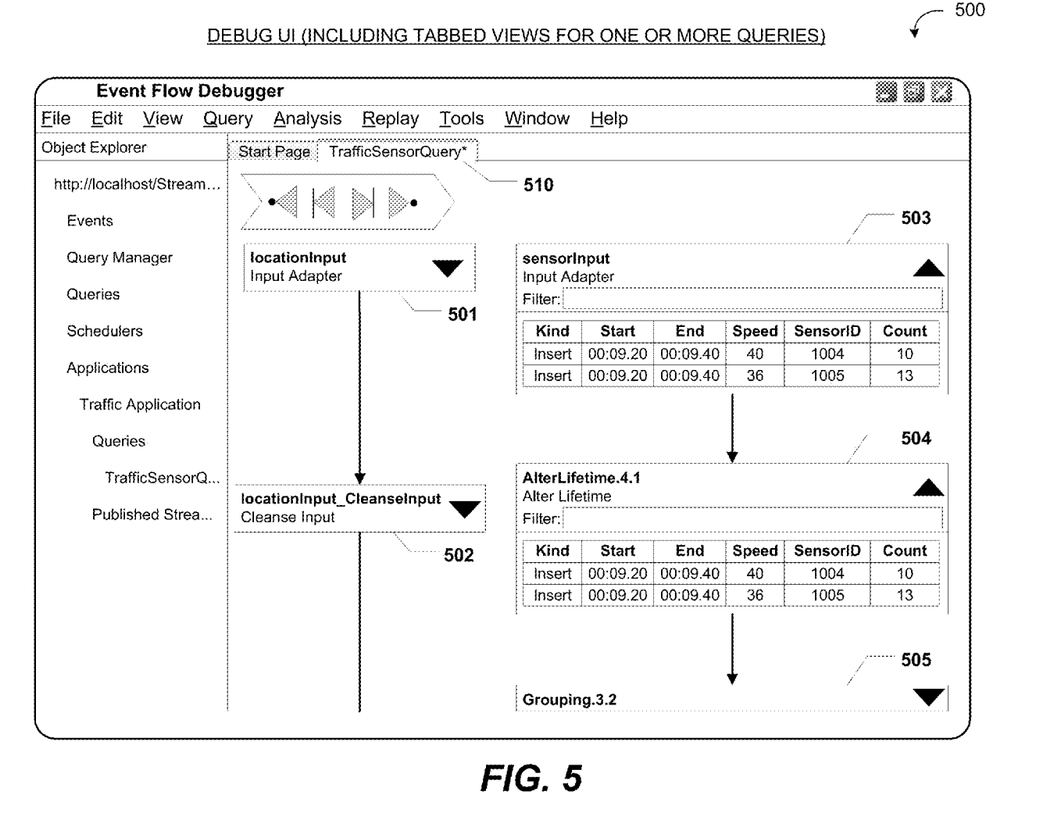
FIG. 5 is a screenshot to illustrate a particular embodiment of the UI of FIG. 1 and FIG. 2.

FIG. 5 is a screenshot to illustrate a particular embodiment of a debug UI 500. In an illustrative embodiment, the debug UI 500 is the debug UI 120 of FIG. 1 or the debug UI 230 of FIG. 2.

In the particular embodiment illustrated in FIG. 1, the debug UI 500 is operable to display graphs of CEP query operators in tabs (e.g., an illustrative tab 510 for an illustrative CEP query "TrafficSensorQuery"). Each tab may be a display canvas, and the user may perform one or more debug analyses at each such display canvas. The debug UI 500 may include multiple display canvases for a single CEP query as well as display canvases for multiple CEP queries.

For example, the graph for the illustrated "TrafficSensorQuery" displays five nodes corresponding to five operators: a first input adapter operator 501, a cleanse input operator 502, a second input adapter operator 503, an alter lifetime operator 504, and a grouping (i.e., partitioning) operator 505. The debug UI 500 may be modified (e.g., by "zooming out") to display additional operators of the "TrafficSensorQuery."

Figure 6:
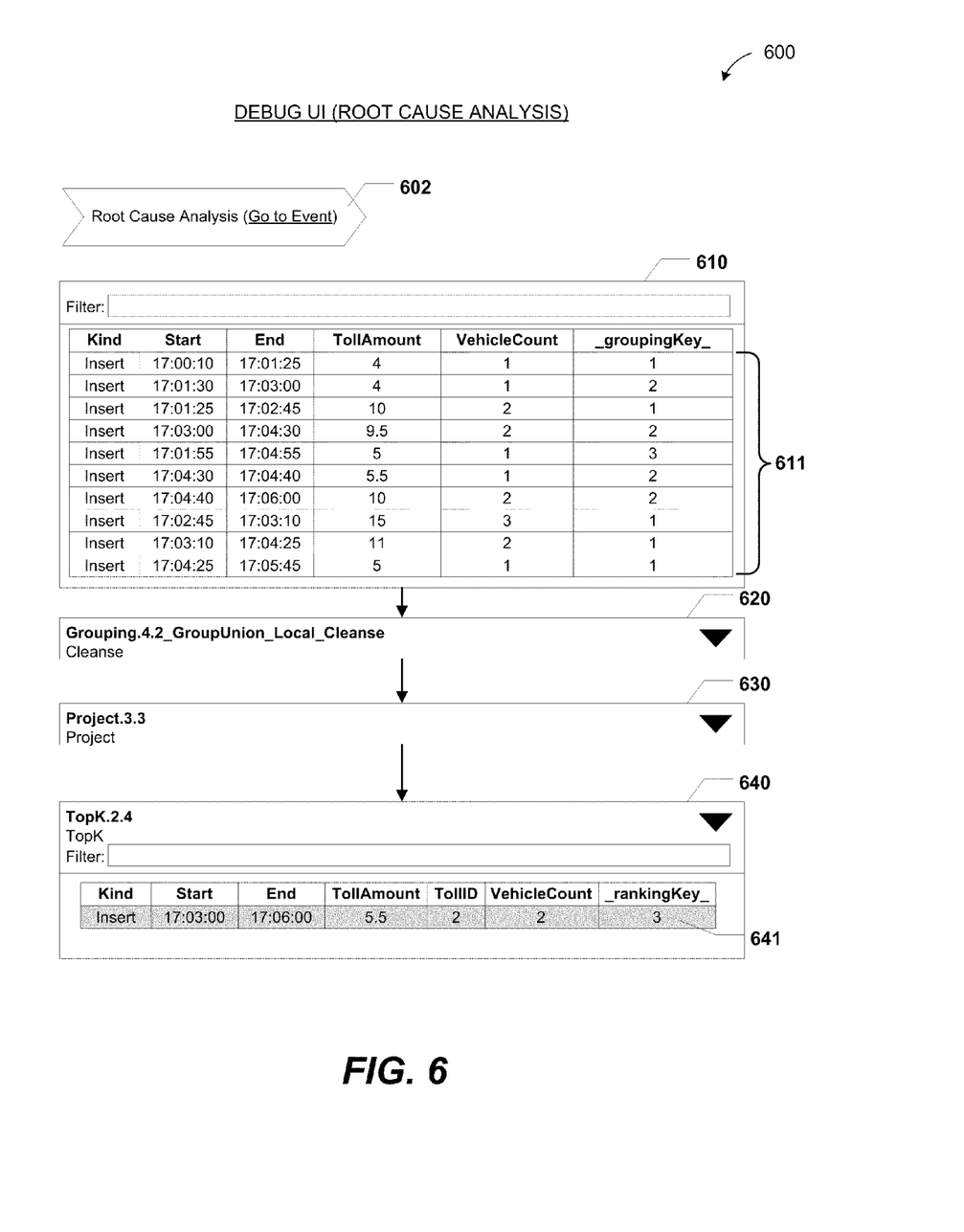
FIG. 6 is a screenshot to illustrate another particular embodiment of the UI of FIG. 1 and FIG. 2.

FIG. 6 is a screenshot to illustrate another particular embodiment of a debug UI 600. In an illustrative embodiment, the debug UI 600 is the debug UI 120 of FIG. 1 or the debug UI 230 of FIG. 2. In a particular embodiment, the UI elements illustrated in FIG. 6 may be displayed within a single tab (e.g., the tab 510 of FIG. 5).

The debug UI 600 illustrates a particular embodiment of root cause analysis (e.g., performed by the root cause analysis module 222 of FIG. 2), as indicated by the analysis identifier 602 at the top of the debug UI 600. The debug UI 600 displays an input operator 610, a grouping operator 620, a projection operator 630, and a topK operator 640 of the "TrafficSensorQuery."

In the embodiment illustrated, root cause analysis is performed with respect to an event 641. For example, a user may desire to learn why the event 641 has the rank (indicated by the "_rankingKey_") of 3 for a "TollAmount" of 5.5. The root cause analysis may result in the debug UI 600 identifying (e.g., highlighting) events that caused the event 641. For example, the debug UI 600 may highlight events including the event 611 at the input operator 610.

Figure 7:
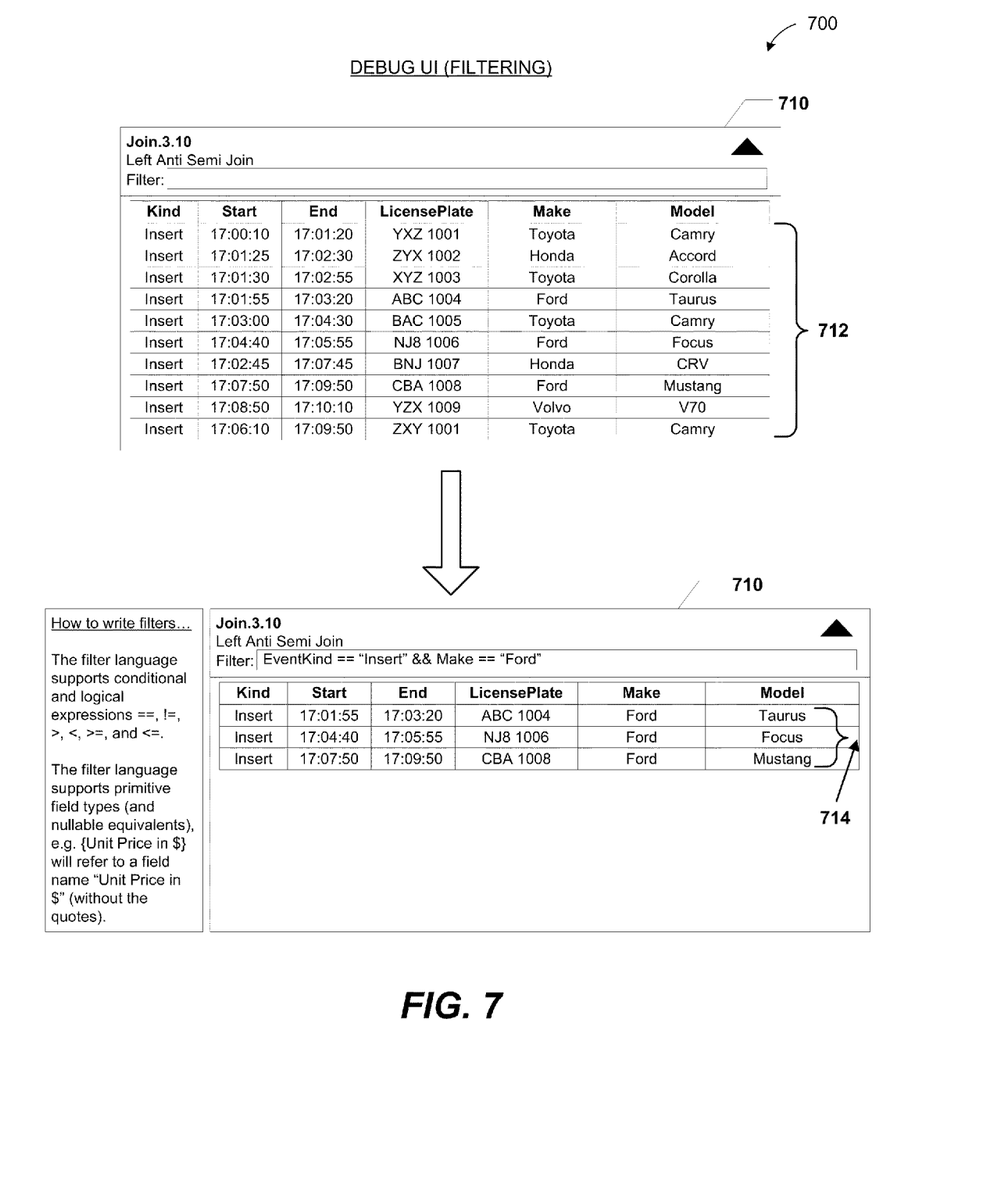
FIG. 7 is a screenshot to illustrate another particular embodiment of the UI of FIG. 1 and FIG. 2.

FIG. 7 is a screenshot to illustrate another particular embodiment of a debug UI 700. In an illustrative embodiment, the debug UI 700 is the debug UI 120 of FIG. 1 or the debug UI 230 of FIG. 2. In a particular embodiment, the UI elements illustrated in FIG. 7 may be displayed within a single tab (e.g., the tab 510 of FIG. 5).

The debug UI 700 illustrates a particular embodiment of filtering events (e.g., by the filtering module 223 of FIG. 2). The debug UI 700 displays a join operator 710 of the "TrafficSensorQuery." Prior to filtering, the node corresponding to the join operator 710 may display an unfiltered set of events 712. A user may filter events displayed at the join operator 710. For example, in the particular embodiment illustrated in FIG. 7, the unfiltered set of events 712 is filtered such that events of the kind "Insert" and having a "Make" of "Ford" are displayed, while other events are hidden. A filtered set of events 714 may thus be obtained.

Figure 8:
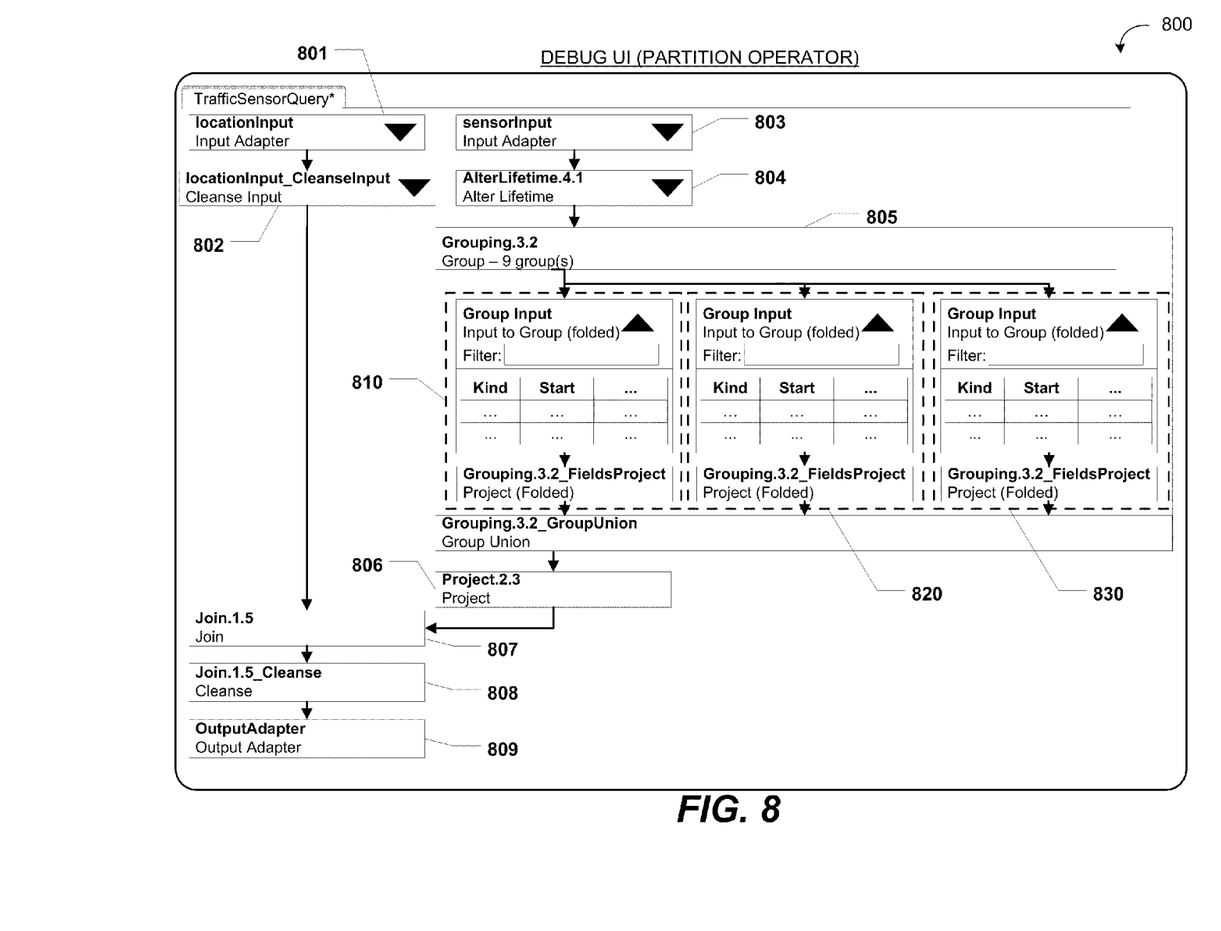
FIG. 8 is a screenshot to illustrate another particular embodiment of the UI of FIG. 1 and FIG. 2.

FIG. 8 is a screenshot to illustrate another particular embodiment of a debug UI 800. In an illustrative embodiment, the debug UI 800 is the debug UI 120 of FIG. 1 or the debug UI 230 of FIG. 2.

The debug UI 800 illustrates a particular embodiment of folding/unfolding partitions (e.g., by the partition folding/unfolding module 225 of FIG. 2). The "TrafficSensorQuery" includes nine operators 801-809, each of which is represented by a node of a graph. One of the operators is a grouping (e.g., partitioning) operator 805. When the grouping operator 805 is displayed in a "folded" state, the grouping operator 805 may be displayed as a single execution unit as illustrated by the grouping operator 505 of FIG. 5. Alternately, the grouping operator 805 may be "unfolded" as illustrated in FIG. 8. When the grouping operator 805 is unfolded, the grouping operator may display event and execution details for specific partitions. For example, in FIG. 8, the grouping operator 805 "unfolds" into three partitions 810, 820, and 830.

Figure 9:
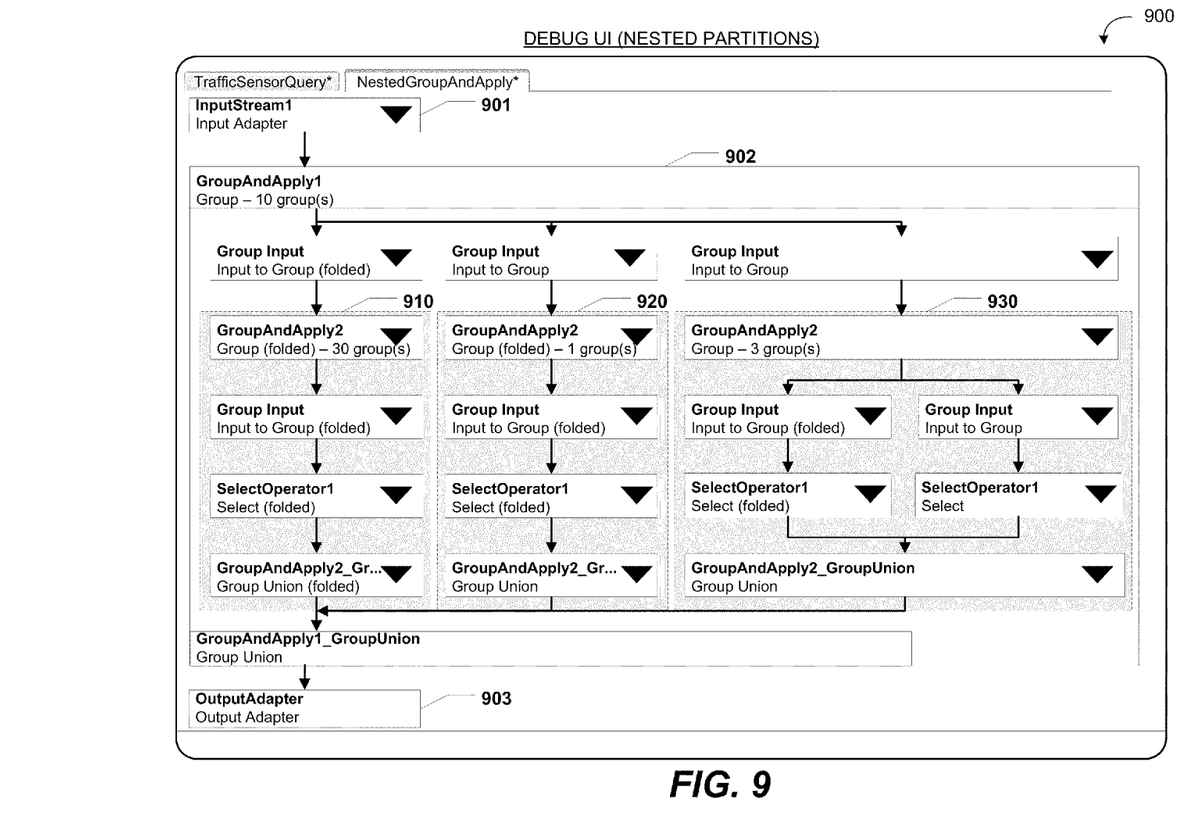
FIG. 9 is a screenshot to illustrate another particular embodiment of the UI of FIG. 1 and FIG. 2.

FIG. 9 is a screenshot to illustrate another particular embodiment of a debug UI 900. In an illustrative embodiment, the debug UI 900 is the debug UI 120 of FIG. 1 or the debug UI 230 of FIG. 2.

The debug UI 900 illustrates a particular embodiment of folding/unfolding nested partitions (e.g., by the partition folding/unfolding module 225 of FIG. 2). It should be noted that FIG. 9 illustrates the ability to open a second tab for a particular query. For example, a "NestedGroupAndApply" tab may have been opened to provide a blank canvas in which to unfold nested partitions of the "TrafficSensorQuery."

The graph displayed in the "NestedGroupAndApply" tab shows three operators 901-903, each of which is represented by a node of the graph. One of the operators is a grouping (e.g., partitioning) operator 902. The grouping operator 902 includes nested grouping operators 910, 920, and 930. Each of the nested grouping operators 910, 920, and 930 may also be "folded" and "unfolded." Further, the debug UI 900 may provide a visual indicator of whether a partition is folded or unfolded and of how many partitions are generated by a portioning operator. For example, the parent grouping operator 902 "GroupAndApply1" indicates that it generates ten groups (e.g., partitions) and the nested grouping operator 910 "GroupAndApply2" indicates that it is folded.

It will be appreciated that the UI embodiments illustrated in FIGS. 5-9 may enable users (e.g., software developers) to visually evaluate and debug CEP queries. For example, a CEP debug UI may provide the ability to create multiple display canvases (e.g., tabs) for different parts of a CEP query. Each such tab may provide a more in-depth "zoomed-in" view of particular operators. As another example, a CEP debug UI may provide the ability to evaluate a partitioning operator as a single execution unit (e.g., when the operator is "folded") as well as the ability to evaluate individual partitions of a partitioning operator (e.g., when the operator is "unfolded").

Figure 10:
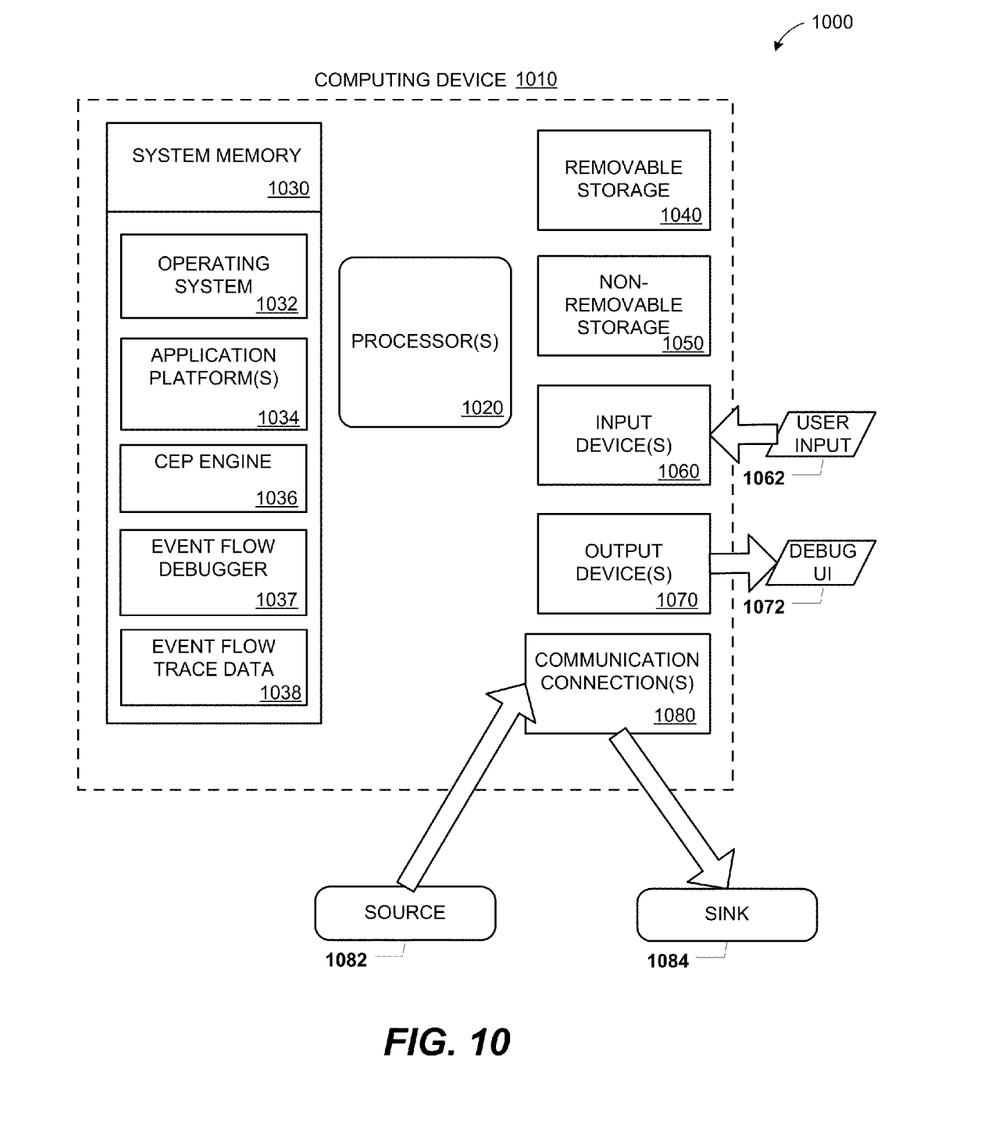
FIG. 10 is a block diagram of a computing environment including a computing device operable to support embodiments of computer-implemented methods, computer program products, and system components as illustrated in FIGS. 1-9.

FIG. 10 depicts a block diagram of a computing environment 1000 including a computing device 1010 operable to support embodiments of computer-implemented methods, computer program products, and system components according to the present disclosure.

The computing device 1010 includes at least one processor 1020 and a system memory 1030. Depending on the configuration and type of computing device, the system memory 1030 may be volatile (such as random access memory or "RAM"), non-volatile (such as read-only memory or "ROM," flash memory, and similar memory devices that maintain stored data even when power is not provided), or some combination of the two. The system memory 1030 typically includes an operating system 1032, one or more application platforms 1034, one or more applications, and program data. For example, the system memory 1030 may include a CEP engine 1036, an event flow debugger 1037, and event flow trace data 1038. In an illustrative embodiment, the CEP engine 1036 is the CEP engine 103 of FIG. 1, the event flow debugger 1037 is the event flow debugger 110 of FIG. 1 or the event flow debugger 220 of FIG. 2, and the event flow trace data 1038 represents the event flow 107 of FIG. 1 or the event flow 210 of FIG. 2.

The computing device 1010 may also have additional features or functionality. For example, the computing device 1010 may also include removable and/or non-removable additional data storage devices such as magnetic disks, optical disks, tape, and standard-sized or flash memory cards. Such additional storage is illustrated in FIG. 10 by removable storage 1040 and non-removable storage 1050. Computer storage media may include volatile and/or non-volatile storage and removable and/or non-removable media implemented in any technology for storage of information such as computer-readable instructions, data structures, program components or other data. The system memory 1030, the removable storage 1040 and the non-removable storage 1050 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 1010. Any such computer storage media may be part of the computing device 1010.

The computing device 1010 may also have input device(s) 1060, such as a keyboard, mouse, pen, voice input device, touch input device, etc. Output device(s) 1070, such as a display, speakers, printer, etc. may also be included. For example, the input device(s) 1060 may receive user input 1062 (e.g., the user input 240 of FIG. 2) and the output device(s) may display a debug UI 1072 (e.g., the debug UI 120 of FIG. 1 or the debug UI 230 of FIG. 2). The computing device 1010 also contains one or more communication connections 1080 that allow the computing device 1010 to communicate with other computing devices over a wired or a wireless network. For example, the other computing devices may include a source 1082 (e.g., the source 101 of FIG. 1) and a sink 1084 (e.g., the sink 106 of FIG. 1). The source 1082 and the sink 1084 may be parts of a CEP system, such as a manufacturing system, a process control system, a utilities system, a financial trading system (e.g., as described with reference to FIG. 1), a web application, an information technology system, or a data center monitoring system.

It will be appreciated that not all of the components or devices illustrated in FIG. 10 or otherwise described in the previous paragraphs are necessary to support embodiments as herein described. For example, the removable storage 1040 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
   receiving an event flow from a complex event processing (CEP) engine, the event flow resulting from execution by the CEP engine of a complex event processing (CEP) query comprising a plurality of operators;
   generating a user interface (UI) representing the event flow, wherein the UI comprises a graph that includes a plurality of nodes, wherein each node of the graph corresponds to an operator of the CEP query, and wherein each edge of the graph corresponds to a stream between operators of the CEP query;
   receiving a first user input identifying a particular node of the graph, wherein the particular node corresponds to a particular operator of the CEP query;
   in response to the first user input identifying the particular node of the graph:
      expanding the particular node that corresponds to the particular operator of the CEP query in the graph; and
      displaying, in the particular node of the graph as expanded, a particular event processed by the CEP engine during execution of the particular operator, wherein an intermediate state of the particular event outputted responsive to execution of the particular operator is displayed in the particular node of the graph; and
      in response to a second user input selecting the particular event displayed in the particular node of the graph, highlighting a different event displayed in a different node of the graph, wherein the different node of the graph corresponds to a different operator of the CEP query, the different event displayed in the different node of the graph is processed by the CEP engine during execution of the different operator, and the different event displayed in the different node of the graph that is highlighted is one of a downstream event caused by the particular event or an upstream event that caused the particular event.

2. The computer-implemented method of claim 1, wherein the event flow comprises a sequence of events associated with the execution of the CEP query, and wherein at least one of the plurality of operators is not a filtering operator.

3. The computer-implemented method of claim 1, wherein the event flow comprises a file including a sequence of events associated with a previously executed CEP query, and wherein the plurality of operators comprises one or more of an input adapter operator, a cleanse input operator, an alter lifetime operator, a grouping operator, a projection operator, or a topk operator.

4. The computer-implemented method of claim 1, wherein the intermediate state of the particular event comprises an event kind of the particular event, an event start time of the particular event, an event end time of the particular event, a new event end time of the particular event, a log time of the particular event, latency information of the particular event, and a data payload of the particular event.

5. The computer-implemented method of claim 1, wherein the CEP engine receives events from an input adapter, and wherein the CEP engine is operable to convert the received events into a native format of the CEP engine.

6. The computer-implemented method of claim 1, further comprising filtering events displayed in the particular node of the graph corresponding to the particular operator of the CEP query to display a filtered subset of events.

7. The computer-implemented method of claim 6, wherein the filtering is based on a user-defined filtering criteria.

8. The computer-implemented method of claim 7, wherein the user-defined filtering criteria is based on event start time, event end time, new event end time, event log time, event latency, event payload, or any combination thereof.

9. The computer-implemented method of claim 1, further comprising providing, via the UI, selectability to at least an event propagation analysis (EPA) module, a filter module, a fold or unfold module, and a root cause analysis (RCA) module.

10. The computer-implemented method of claim 1, wherein the particular operator of the CEP query is a partitioning operator represented on the graph as a single execution unit and further comprising converting the single execution unit into a plurality of partitions generated by the partitioning operator.

11. The computer-implemented method of claim 10, wherein at least one of the plurality of partitions comprises a partition-specific execution unit, a nested partition, or any combination thereof.

12. The computer-implemented method of claim 10, further comprising displaying partition-specific outputs associated with at least one event processed by at least one partition, wherein the at least one partition is selected based on a user-defined set of partition keys.

13. The computer-implemented method of claim 1, further comprising receiving the second user input selecting the particular event displayed in the particular node of the graph for event propagation analysis, wherein the different event displayed in the different node of the graph that is highlighted in response to the second user input is the downstream event caused by the particular event.

14. The computer-implemented method of claim 1, further comprising receiving the second user input selecting the particular event displayed in the particular node of the graph for root cause analysis, wherein the different event displayed in the different node of the graph that is highlighted in response to the second user input is the upstream event that caused the particular event.

15. A system, comprising:
at least one processor; and
memory coupled to the at least one processor, the memory storing instructions, that when executed by the at least one processor, cause execution of:

a complex event processing (CEP) engine configured to:
  execute a CEP query comprising a plurality of operators; and
  generate an event flow resulting from execution of the CEP query; and
an event flow debugger configured to:
  generate a user interface (UI) representing the event flow, wherein the UI comprises a graph that includes a plurality of nodes, wherein each node of the graph corresponds to an operator of the CEP query, and wherein each edge of the graph corresponds to a stream connection between operators of the CEP query;
  receive a first user input identifying a particular node of the graph, the particular node corresponding to a particular operator of the CEP query;
  in response to the first user input identifying the particular node of the graph:
    expand the particular node that corresponds to the particular operator of the CEP query in the graph; and
    display, in the particular node of the graph as expanded, a particular event processed by the CEP engine during execution of the particular operator, wherein an intermediate state of the particular event outputted responsive to execution of the particular operator is displayed in the particular node of the graph; and
  in response to a second user input selecting the particular event displayed in the particular node of the graph, highlight a different event displayed in a different node of the graph, wherein the different node of the graph corresponds to a different operator of the CEP query, the different event displayed in the different node of the graph is processed by the CEP engine during execution of the different operator, and the different event displayed in the different node of the graph that is highlighted is one of a downstream event caused by the particular event or an upstream event that caused the particular event.

16. The system of claim 15, wherein the UI comprises a first display canvas associated with the CEP query, and wherein the UI is operable to generate a second display canvas associated with the CEP query.

17. The system of claim 15, wherein the event flow debugger is further configured to:
receive the second user input selecting the particular event displayed in the particular node of the graph for event propagation analysis;
wherein the different event displayed in the different node of the graph that is highlighted in response to the second user input is the downstream event caused by the particular event.

18. The system of claim 15, wherein the event flow debugger is further configured to:
receive the second user input selecting the particular event displayed in the particular node of the graph for root cause analysis;
wherein the different event displayed in the different node of the graph that is highlighted in response to the second user input is the upstream event that caused the particular event.

19. A system, comprising:

at least one processor; and memory comprising computer-executable instructions that, when executed by the at least one processor, cause the at least one processor to perform acts comprising:

receiving data representing an event flow resulting from execution of a complex event processing (CEP) query comprising a plurality of operators;

generating a user interface (UI) representing the event flow, wherein the UI comprises a graph that includes a plurality of nodes, wherein each node of the graph corresponds to an operator of the CEP query, wherein each edge of the graph corresponds to a stream between operators of the CEP query, wherein the UI displays a first state of operation of the CEP query corresponding to a first time;

receiving input identifying a particular node of the graph, wherein the particular node corresponds to a particular operator of the CEP query;

in response to the input identifying the particular node of the graph:

expanding the particular node that corresponds to the particular operator of the CEP query in the graph; and displaying, in the particular node of the graph as expanded, a particular event processed during execution of the particular operator;

receiving input selecting the particular event displayed in the particular node of the graph; and in response to the input selecting the particular event displayed in the particular node of the graph, highlighting a different event displayed in a different node of the graph, wherein the different node of the graph corresponds to a different operator of the CEP query, the different event displayed in the different node of the graph is processed during execution of the different operator, and the different event displayed in the different node of the graph that is highlighted is one of a downstream event caused by the particular event or an upstream event that caused the particular event.

20. The system of claim 19, the memory further comprising computer-executable instructions that, when executed by the at least one processor, cause the at least one processor to perform acts comprising:

receiving input identifying a step back function of the UI; and in response to the input identifying the step back function of the UI, displaying a second state of operation of the CEP query corresponding to a second time that is prior to the first time.

* * * * *